(12) United States Patent
Laurito

(10) Patent No.: US 7,350,622 B2
(45) Date of Patent: Apr. 1, 2008

(54) POWDERED GRAPHITE APPLICATOR

(75) Inventor: Patrick J. Laurito, Atlantic, IA (US)

(73) Assignee: Precision Rotary Equipment, Inc., Atlantic, IA (US)

( * ) Notice: Subject to any disclaimer, the term of this patent is extended or adjusted under 35 U.S.C. 154(b) by 695 days.

(21) Appl. No.: 10/778,690

(22) Filed: Feb. 13, 2004

(65) Prior Publication Data

US 2005/0178620 A1    Aug. 18, 2005

(51) Int. Cl.
     *F16N 27/00*    (2006.01)

(52) U.S. Cl. ...................... 184/7.4; 184/65; 222/185.1; 222/504; 222/559

(58) Field of Classification Search .................. 184/7.4, 184/81, 65, 109, 79; 222/185, 485, 504, 222/518, 559
See application file for complete search history.

(56) References Cited

U.S. PATENT DOCUMENTS 5,421,431 A * 6/1995 Graen .......................... 184/7.4
6,129,216 A * 10/2000 Vandewinckel et al. ..... 209/660
2001/0017360 A1 * 8/2001 Watanabe et al. ....... 251/129.17
2003/0154852 A1 * 8/2003 Haerr et al. ................... 91/367

* cited by examiner

*Primary Examiner*—David M. Fenstermacher
(74) *Attorney, Agent, or Firm*—McKee, Voorhees & Sease, P.L.C.

(57) ABSTRACT

The powdered graphite applicator includes a container with a lid at the upper end and a screen at the lower end. A plate is provided inside the container to define the bottom of the graphite chamber. The plate has an enlarged opening which is normally closed by a gate. The gate can be periodically opened to allow graphite to pass through the plate opening, and then to fall from the plate through the screen and onto the surface of an adjacent roller of a rotatable drum. Movement of the gate is controlled by a cylinder with an extensible arm. Extension and retraction of the cylinder arm is automatically controlled by a solenoid and a programmed controller.

12 Claims, 4 Drawing Sheets

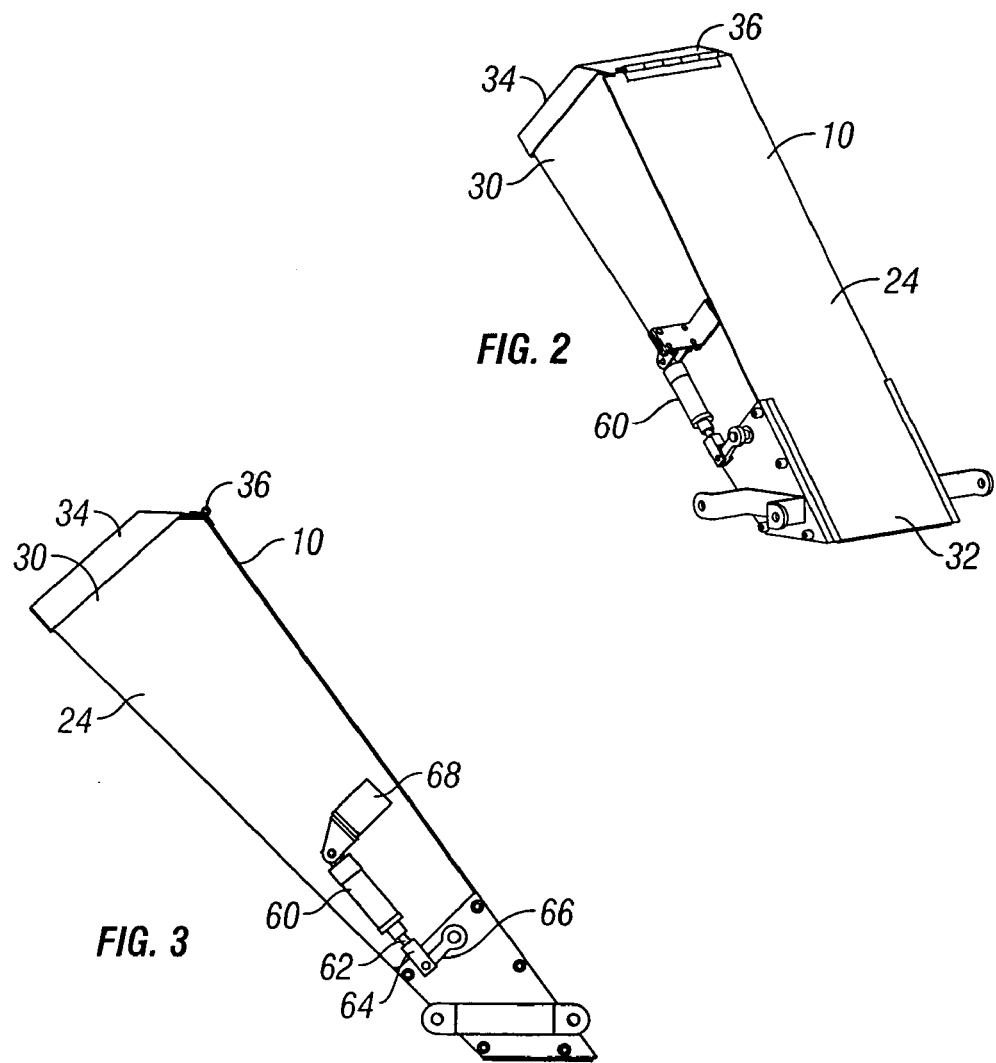
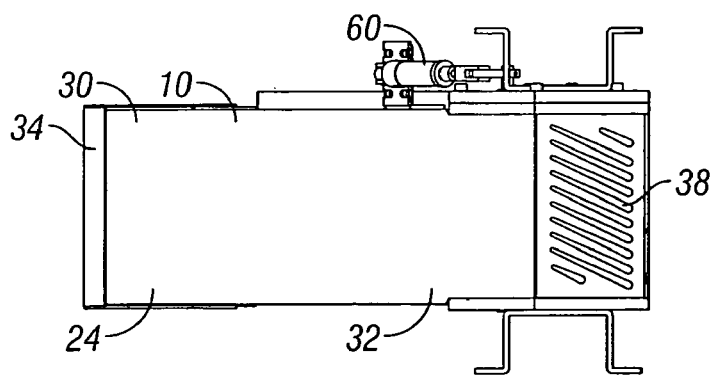
FIG. 4

POWDERED GRAPHITE APPLICATOR

BACKGROUND OF THE INVENTION

Rotating drums are used for various purposes, such as drying kilns and spray coating machines for coating products such as snack foods, seeds, and pharmaceuticals. The drums are supported on rollers or trunnion wheels and typically are rotated by a motor-driven gear or chain. Powder graphite is often used to lubricate the surface of the drum rollers and the riding ring extending around the drum. One example of a powdered graphite applicator is disclosed in U.S. Pat. No. 5,421,431. Conventional graphite applicators, such as disclosed in the U.S. Pat. No. 5,421,431 have several problems. First, conventional applicators dispense the powder graphite through small holes which have a tendency to become clogged. Also, when used with a rotating drum dryer, the heat from the dryer causes warpage of the control piston inside the applicator, causing drag and eventual failure. Furthermore, with an applicator such as disclosed in the U.S. Pat. No. 5,421,431, the cover or lid for the graphite storage compartment is dangerously close to the driving ring of the drum and makes filling of the compartment difficult. The relatively large number of moving and machined components in the conventional applicator also leads to increased manufacturing costs.

Some applicators apply graphite using air, which dispenses the graphite not only on the rollers but also into the air resulting in a great waste of graphite. Also, silicate in the powdered graphite is an air born health hazard.

Accordingly, a primary objective of the present invention is the provision of an improved powdered graphite applicator for use on rotating drums.

Another objective of the present invention is the provision of a powdered graphite applicator which provides an even flow of graphite onto the drum roller support surface.

Another objective of the present invention is the provision of a powdered graphite applicator which allows for easy and safe filling of the graphite chamber.

Still another objective of the present invention is the provision of a powdered graphite applicator which eliminates clogging due to humidity or graphite settling.

Yet another objective of the present invention is the provision of a powdered graphite applicator which is adjustable so as to apply a desired amount of graphite to the roller surfaces.

A further objective of the present invention is the provision of an improved powdered graphite applicator which is adjustable by a remote PLC controller.

Another objective of the present invention is the provision of a graphite applicator which is economical to manufacture, and durable, effective, and safe in use.

These and other objectives will become apparent from the following description of the invention.

SUMMARY OF THE INVENTION

The improved powdered graphite applicator of the present invention lubricates the support rollers of a rotating drum. The applicator includes a graphite container having open upper and lower ends. A lid is pivotally connected to the upper end to allow for filling of the chamber with powdered graphite. A screen covers the lower end of the container.

The container includes an internal plate defining a false bottom or floor for the graphite chamber. The plate has at least one hole, which is normally sealed by a pivotal gate movable between open and closed positions relative to the hole. When the gate is open, powdered graphite flows through the hole, and then spreads out across the plate, before falling through the screen and onto the adjacent roller surface.

BRIEF DESCRIPTION OF THE DRAWINGS

FIG. 2 is a perspective view of the graphite applicator of the present invention.

FIG. 3 is a side elevation view of the graphite applicator.

FIG. 4 is a bottom plan view of the graphite applicator.

DETAILED DESCRIPTION OF THE PREFERRED EMBODIMENT

Figure 1:
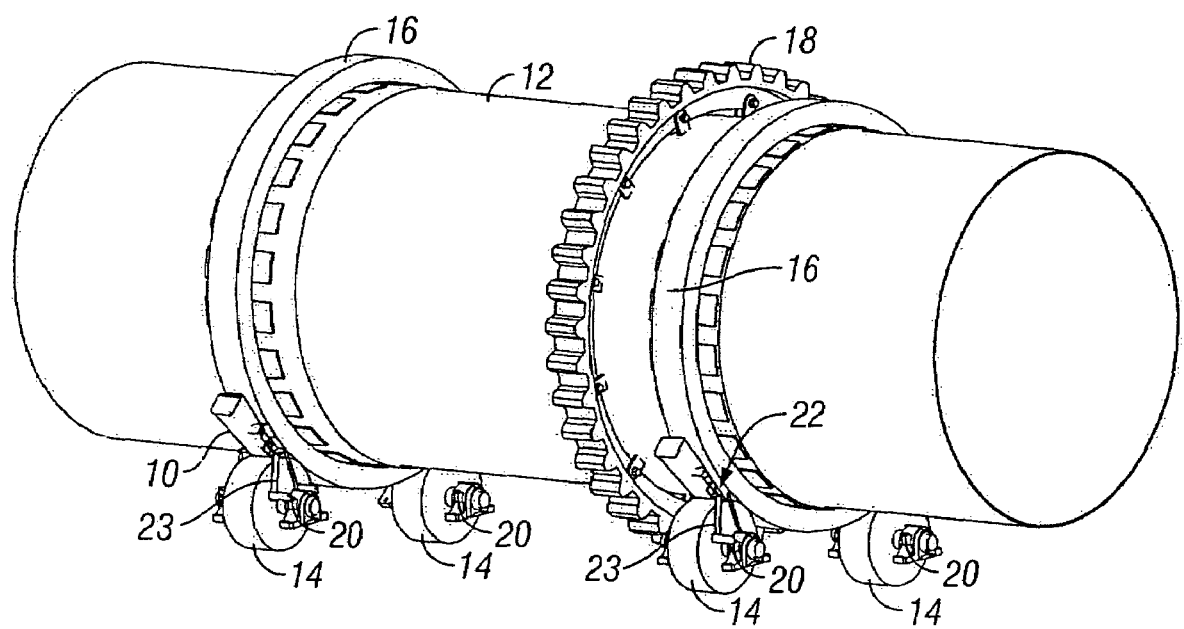
FIG. 1 is a perspective view of a rotatable drum mounted on support rollers with a powdered graphite applicator of the present invention installed adjacent each of the drum rings.

FIG. 1 shows the graphite applicator 10 of the present invention as used on a rotatable drum 12. The drum 12 is supported by two pairs of rollers or trunnion wheels 14 which engage respective drum rings 16 extending around the periphery of the drum 12. The drum 12 also includes a drive ring 18 which is driven by a motor (not shown) with a meshing gear or chain. The structure of the drum 12 and rollers 14 is conventional, and do not constitute a part of the present invention.

One graphite applicator 10 is utilized for each drum ring 16. The graphite applicator 10 is mounted to the pillow block bearings 20 of one of the rollers 14 adjacent a pinch point 22 between the rollers 14 and the drum 12. If the support rollers are adjusted via the bearings 20, the applicator 10 is also automatically adjusted to maintain top performance of the applicator 10 in lubricating the rollers 14 and support rings 16. The graphite applicator 10 is mounted to the roller bearings 20 via mounting brackets 21 and support members 23.

The components of the applicator 10 are best shown in FIGS. 2-5. The graphite applicator 10 includes a container or box 24 for holding powdered graphite. The container 24 is formed from a U-shaped front panel 26 and back panel 28. The upper end 30 and lower end 32 of the container 24 are open. A lid 34 is mounted to the upper end 30 by a hinge 36 so as to be movable between open and closed positions. Preferably, the open upper end 30 is oriented so as to face rearwardly or away from the drum 12, as seen in FIG. 1. Hinge 36 is provided on the forward side of the container 24, such that the lid 34 opens towards the drum 12. This orientation of the upper end 30 simplifies filling of the container 24 with powdered graphite, and spaces the upper end 30 away from the drum for safety.

Figure 5:
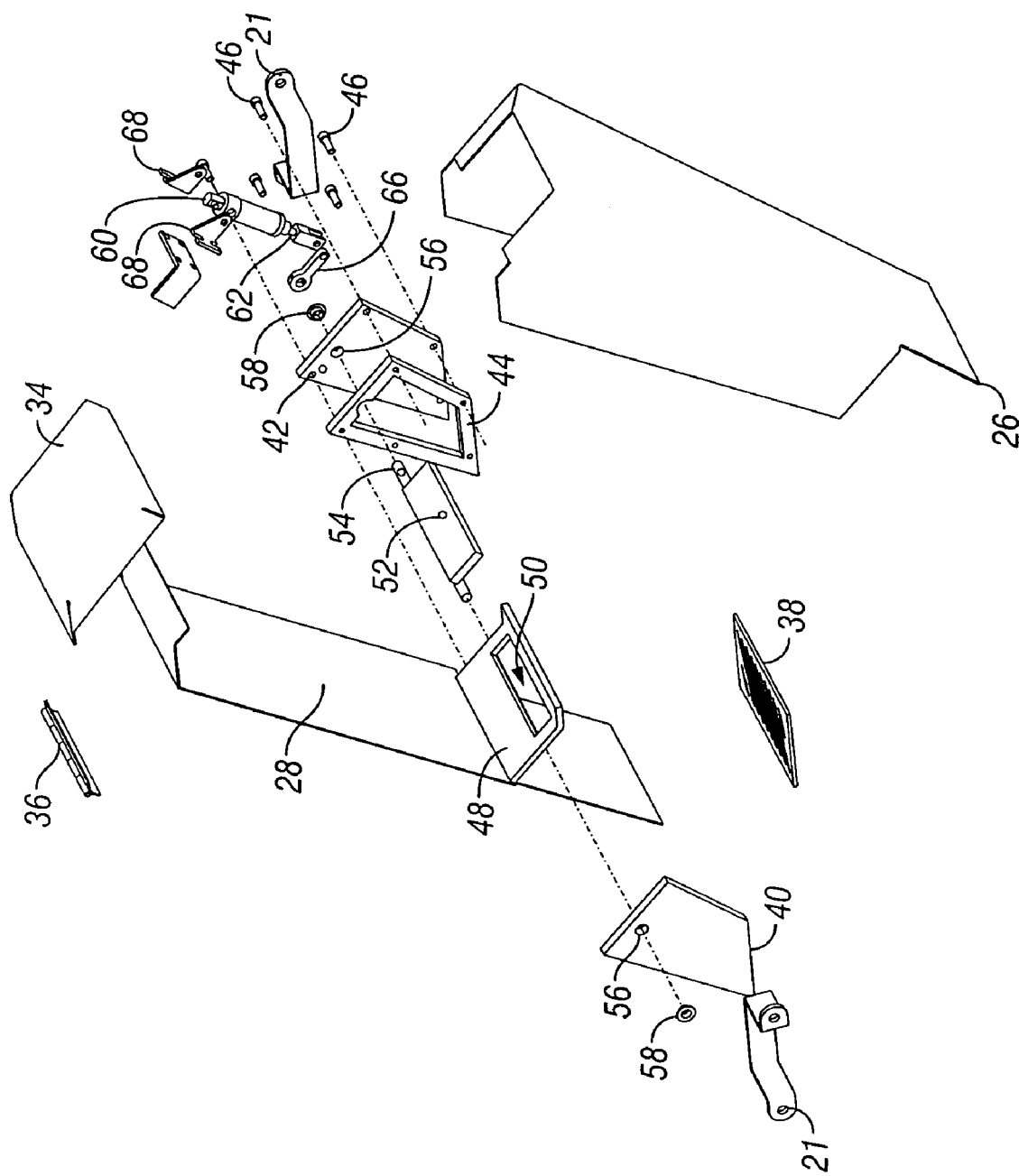
FIG. 5 is an exploded view of the graphite applicator.
Figure 6:
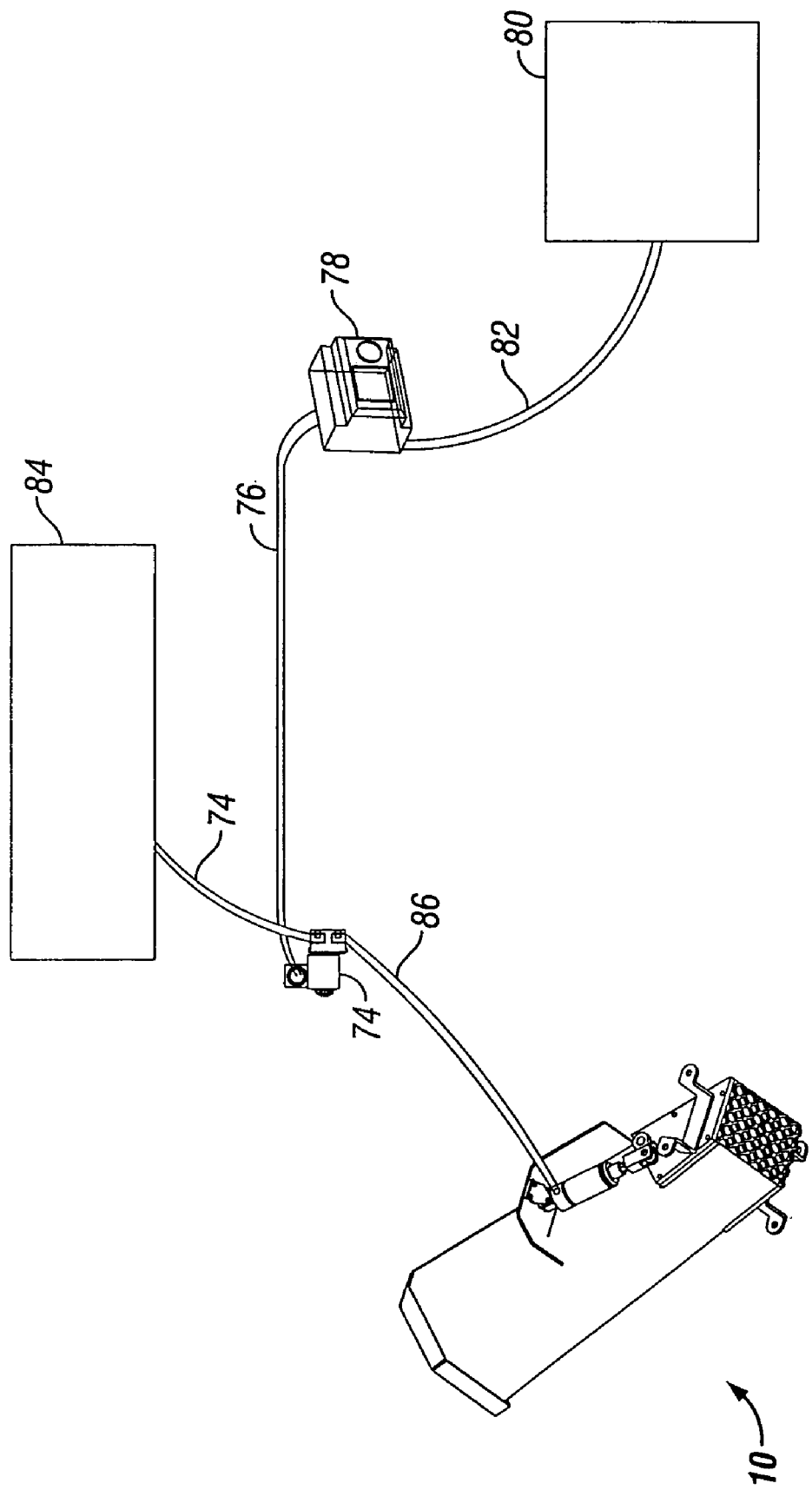
FIG. 6 is a schematic view showing the control system for the graphite applicator.

The lower end 32 of the container 24 is covered with a screen or grate 38 having a plurality of openings through which the powdered graphite falls for placement onto the surface of the adjacent roller 14. The openings in the screen 38 extend substantially across the area of the screen 38 and are sufficiently large to preclude clogging. A screen 38 may be expanded mesh, preferably rolled or flattened, as shown in FIG. 6, or any other suitable material. As an alternative to a mesh screen, the screen 38 may be formed with elongated slots, as shown in FIG. 5, which allow the powdered graphite to be evenly distributed onto the roller surface.

The lower portion of the container 24 includes opposite side panels 40, 42. Preferably, the side panel 40 is welded to the front and back panels 26, 28, and the side panel 42 is removably mounted to a frame 44 using fasteners, such as bolts or cap screws 46. The frame 44 is welded to the front and back panels 26, 28.

Mounted inside the container 24 is a plate 48 which defines a bottom or floor of the graphite chamber. The plate 48 has an enlarged opening 50 which is normally sealed by a pivotal gate 52. The gate 52 includes a mounting shaft 54 which extends through corresponding the holes 56 in the side panels 40, 42. Bushings 58 are provided in the holes 56. The movement of the gate 52 between open and closed positions relative to the plate opening 50 is controlled by a cylinder 60. More particularly, the cylinder includes an extensible arm 62 having a clevis 64 to which an arm 66 is attached at one end. The cylinder 60 is mounted to the container 24 by mounting brackets 68.

As shown schematically in FIG. 6, movement of the cylinder arm 62, and thus the gate 52, is controlled by a solenoid 74 operatively connected via electrical lines 76 to a controller 80. The controller 78 is connected to a power source 80 via electric lines 82. Preferably, the cylinder 60 is pneumatically actuated, and is connected to an air source 84 by air lines 86. One example of a controller 78 is an Allen-Bradley Pico Controller, Model No. 1760-L12AWA sold by Rockwell Automation. The controller 78 may be programmed by a computer or microprocessor.

In operation, the controller 78 automatically opens and closes the gate 52 a desired degree at predetermined times, via the cylinder 60, so as to apply powdered graphite to the surface of the adjacent roller 14. As the drum 12 rotates, graphite coats the support ring 16 and the roller 14 on the opposite side of the drum 12. The plate screen 38 provides an even application of powdered graphite to the roller surface.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A powdered graphite applicator for lubricating support rollers of a rotating drum, comprising:

a container for holding powdered graphite and having open upper and lower ends;

a lid for covering the upper end of the container and being hinged to the container adjacent the drum so as to open away from the drum;

a screen at the lower end of the container;

a plate in the container upstream from the screen and having at least one hole therein through which graphite flows;

a pivotal gate in the container pivotal between a closed position closing the hole in the plate and an open position opening the hole in the plate;

whereby graphite passes through the hole in the plate and then through the screen for application to the rollers when the gate is moved towards the open position.

2. The graphite applicator of claim 1 further comprising a cylinder with an extensible arm to reciprocatably pivot the gate between the open and closed positions.

3. The graphite applicator of claim 2 wherein the cylinder is pneumatic.

4. The graphite applicator of claim 2 further comprising a control system to control movement of the cylinder arm.

5. The graphite applicator of claim 4 wherein the control system includes a solenoid.

6. The graphite applicator of claim 1 further comprising a control system to control movement of the gate.

7. The graphite applicator of claim 6 wherein the control circuit includes a solenoid.

8. The graphite applicator of claim 1 wherein the plate slopes downwardly toward the hole so that graphite flows by gravity through the hole.

9. The graphite applicator of claim 1 wherein the gate is inclined so that graphite flows by gravity over the gate.

10. The graphite applicator of claim 1 wherein the gate is normally closed.

11. The graphite applicator of claim 1 wherein the gate reciprocates between the open and closed positions.

12. The graphite applicator of claim 1 wherein the container is angularly oriented such that the upper end is spaced away from the drum.

* * * * *